United States Patent

[11] 3,550,688

| [72] | Inventor | Kenneth Adrian Norcliffe<br>Huddersfield, England |
|---|---|---|
| [21] | Appl. No. | 626,181 |
| [22] | Filed | Mar. 27, 1967 |
| [45] | Patented | Dec. 29, 1970 |
| [73] | Assignee | David Brown Gear Industries Limited |
| [32] | Priority | Apr. 16, 1966 |
| [33] | | Great Britain |
| [31] | | No. 16777/66 |

[54] AGRICULTURAL TRACTORS
9 Claims, 2 Drawing Figs.

[52] U.S. Cl. ................................................. 172/9
[51] Int. Cl. ............................................... A01b 63/112
[50] Field of Search ................................. 172/59, 465

[56] References Cited
UNITED STATES PATENTS 3,120,278  2/1964  Ashfield et al. ............... 172/9
3,256,940  6/1966  Ashfield ....................... 172/9

*Primary Examiner*—Robert E. Pulfrey
*Assistant Examiner*—Ronald C. Harrington
*Attorney*—Norris & Bateman ABSTRACT: A draft-controlled power lift mechanism for a tractor having a hydrostatic power transmission mechanism, the power lift mechanism being set by a hand lever and subsequently controlled automatically by the compounding of a signal proportional to the pressure in the high-pressure side of the power transmission mechanism and a signal proportional to the motion of a pivoted weight or like device which is responsive to the pitch of the tractor, so that the working depth of an implement hitched to the tractor is influenced by the soil consistency but not by the contours of the ground.

3,550,688

AGRICULTURAL TRACTORS

BACKGROUND OF THE INVENTION

The invention relates to agricultural tractors having a hydraulic powerlift mechanism and a hydrostatic power transmission mechanism.

Hydrostatic power transmission mechanisms for transmitting drive from the engine to the wheels of a vehicle are well known. Hydraulic power lift mechanisms which vary automatically the working depth of an implement hitched to a tractor in accordance with variations in the draft force exerted by the tractor on the implement are also well known, such power lift mechanisms being controlled by a hand lever and also controlled automatically by signals transmitted from the implement. An arrangement has been proposed wherein a hydraulic power lift mechanism is controlled by a hand lever and also controlled automatically solely by signals proportional to the pump outlet pressure in a hydrostatic power transmission mechanism, but this arrangement does not operate correctly except when working on flat, level ground.

SUMMARY OF INVENTION

The object of the present invention is to make such an arrangement suitable for any sort of terrain.

According to the invention, a hydraulic power lift mechanism, for operating hitch means for mounting an implement on a tractor having a hydrostatic power transmission mechanism including at least one pump, said power lift mechanism being controlled by a hand lever and also controlled automatically by pressure responsive means actuated by the transmission pump outlet pressure, is characterized by means responsive to the fore-and-aft pitch of the tractor for canceling out automatically the effect on the power lift mechanism of variations in the transmission pump outlet pressure due to changes in said pitch.

BRIEF DESCRIPTION OF DRAWINGS

In the accompanying drawings, which are by way of example only.

Figure 1:
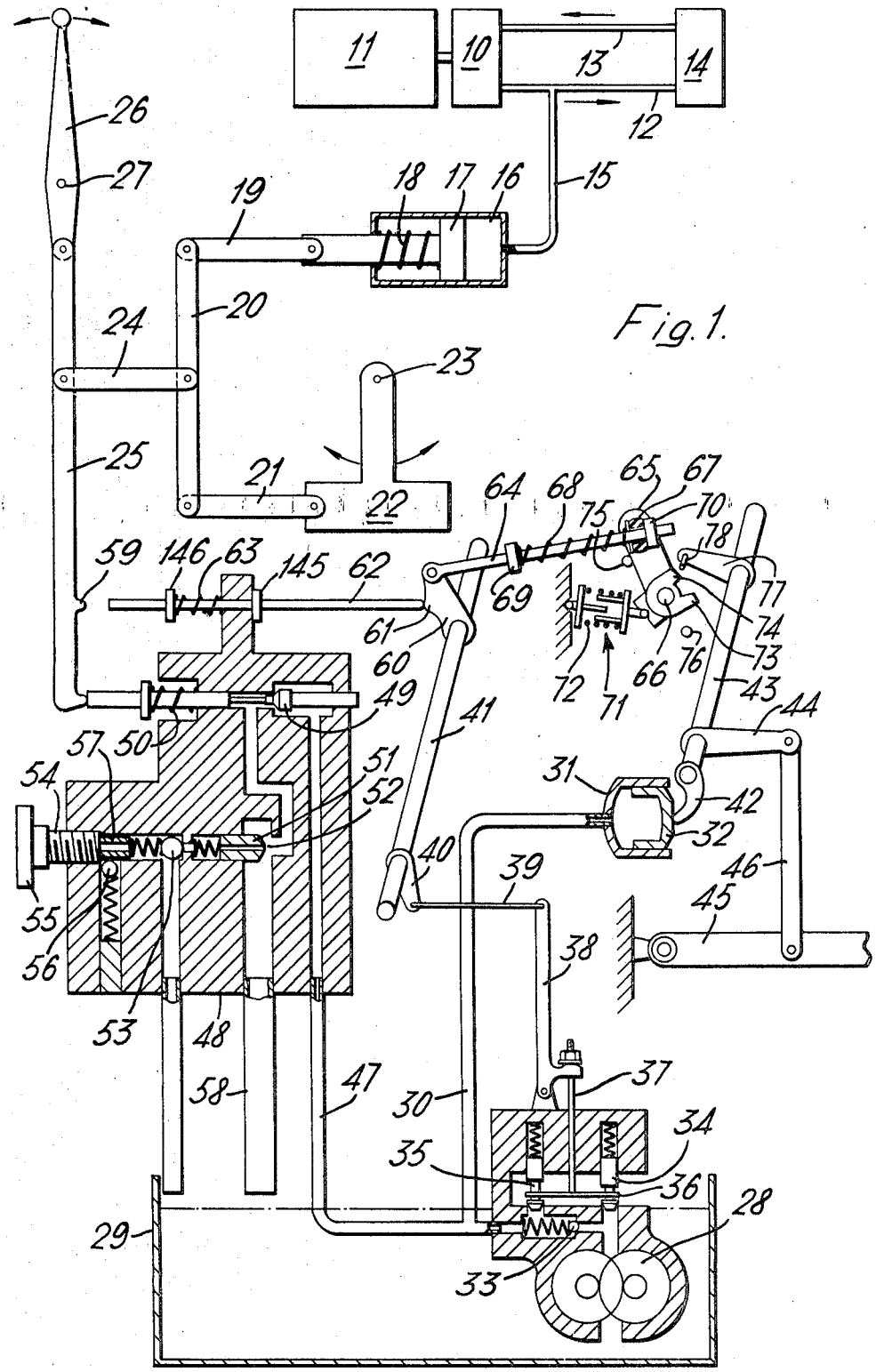
FIG. 1 is a diagrammatic representation of a preferred form of the invention.

In both FIGS. the front of a tractor incorporating the invention is at the left-hand side, and the terms "left," "right," "clockwise" and "anticlockwise" used hereinafter refer to the two forms of the invention as view in the drawings.

DESCRIPTION OF PREFERRED EMBODIMENTS

Referring now to FIG. 1, a hydrostatic power transmission mechanism comprises a pump 10 driven by an engine 11 and connected by a supply conduit 12 and a return conduit 13 to a hydraulic motor 14 which is drivably connected to the rear wheels (not shown) of a tractor. The supply conduit 12 is connected by a conduit 15 to a cylinder 16 containing a piston 17 acted upon by a helical compression spring 18. The piston 17 is pivotally connected to one end of a link 19 the other end of which is pivotally connected to the upper end of a subsidiary balance lever 20. The lower end of said lever is pivotally connected to one end of a link 21 the other end of which is pivotally connected to a weight 22 which can swing about a fixed pivot 23 the axis of which is transverse to the direction of travel of the tractor. The balance lever 20 is pivotally connected, between its ends, to one end of a link 24 the other end of which is pivotally connected to a main balance lever 25 between the ends thereof. The upper end of the balance lever 25 is pivotally connected to the lower end of a hand control lever 26 which is movable about a fixed pivot 27. Friction means (not shown) are provided to hold the hand lever 26 in any required position against the action of the various forces transmitted to the balance lever 25.

A pump 28 draws oil from a sump 29 and communicates on its delivery side, by way of a conduit 30, with a single-acting hydraulic cylinder 31 containing a ram 32. A nonreturn valve 33 is disposed in the conduit 30 and two openings are provided in said conduit, one on the pump side and one on the cylinder side of the valve 33. These openings can be closed by spring-loaded valve members 34 and 35 respectively, each of which is provided with an axial bleed hole (not shown) to conduct oil under pressure to a closed chamber at the rear of the valve member, and each valve member and its seat are do dimensioned that when closed the hydraulic pressure in the closing direction is slightly greater than that in the opening direction. Each of said valve members has a portion of reduced diameter with which there engages one of the bifurcated ends of a plate 36 secured rigidly to an axially slidable rod 37 which is operable by a bellcrank lever 38 pivotally connected to one end of a rod 39 the other end of which is pivotally connected to an arm 40 fixed on a shaft 41 adapted to be moved angularly about its axis by means hereinafter referred to. The portion of reduced diameter is longer in the case of the valve member 35 than of the valve member 34, such that upward movement of the plate 36 will lift the valve member 34 from its seat prior to lifting the valve member 35. The connection between the rod 37 and the bellcrank lever 38 is such that movement of said lever in one direction opens one or both of the valve members 34 and 35, whilst movement of said lever in the other direction does not itself close the valve members but permits them to be closed by their associated springs. The ram 32 acts on an arm 42 fixed to a shaft 43 extending laterally across the rear of the tractor, and said shaft can thus be rocked by movement of said ram in the cylinder 31 to cause two laterally spaced lift arms 44 rigidly secured on said shaft to move a pair of laterally spaced lower hitch links 45 about their points of pivotal connection to the tractor by means of respective lift rods 46. For clarity, only one lift arm and its associated hitch link and lift rod are illustrated. A conventional, central, upper hitch link (not shown) is pivotally connected at its front end to the rear of the tractor. Thus an implement connected to the rear ends of the two links 45 and of the upper hitch link can be raised to, and allowed to descend from, an inoperative position.

Connected to the conduit 30, between the nonreturn valve 33 and the cylinder 31, is a conduit 47 communicating with a valve block 48 containing an axially movable control valve 49 comprising a combined poppet and plug valve, that is to say a poppet valve and a throttling valve on the same stem. This valve is so dimensioned that when it is open the forces exerted on it in opposite directions by the pressure of the oil flowing through it balance each other in known manner, and it is adapted to be closed by a helical compression spring 50. when open, the valve 49 throttles the flow of oil from the conduit 47 to an adjustable pressure relief valve assembly. Said assembly is also contained in the block 48 and comprises a spring-closed valve member 51 and an auxiliary valve. The valve member 51 is provided with an axial bleed hole 52 through which oil can communicate with the auxiliary valve, which comprises a spring-loaded ball 53 and a screwed adjusting member 54 having a hand wheel 55. The valve member 51 and its seat are so dimensioned that when closed the hydraulic pressure in the closing direction is slightly greater than that in the opening direction. A spring-loaded ball 56 engages one of a series of axial grooves 57 in the member 54 to facilitate adjustment of the spring force acting on the ball 53. When the pressure immediately upstream of the valve member 51 exceeds a value determined by the setting of the member 54, the oil which has passed through the bleed hold 52 lifts the ball 53 from its seat so that the valve member 51 is hydraulically unbalanced. Said valve member thus opens to an extent sufficient to maintain a predetermined pressure drop between its upstream side and an outlet 58 to the sump 29.

The lower end of the main balance lever 25 bears against one end of the control valve 49, and a short distance above its lower end said lever is provided with a projection 59. The shaft 41 has fixed to it an arm 60 having a projection 61. A rod 62 is slidable axially in the valve block 48, and its ends are aligned with the projections 59 and 61. Said rod carries two fixed flanges 145 and 146 disposed on opposite sides of the valve block, and a helical compression spring 63 is confined between the flange 146 and said block. The arm 60 is pivotally connected to one end of a rod 64, the other end of which is connected by lost motion means to an arm 65 pivotable about a fixed axis 66. Said lost motion means comprise a stud 67 rotatably mounted on the arm 65 and having a diametrical bore in which the rod 64 is slidable. A helical compression spring 68 is confined between the stud 67 and a flange 69 rigidly secured on the rod 64, and the rearward end of the rod 64 has rigidly secured on it another flange 70, an overcenter device 71 including a helical compression spring 72 is associated with the arm 65, and projections 73 and 74 are formed on said arm. Stops 75 and 76 are provided to limit angular movement of the arm 65. An arm 77 rigidly secured on the shaft 43 carries a peg 78 which can engage with the projections 73 and 74.

The closed chamber at the rear of the valve member 34 can communicate with the sump 29 by way of a high-pressure relief valve (not shown) which limits the maximum pressure delivered by the pump 28. The closed chamber at the rear of the valve member 35 also communicates with the sump by way of a high-pressure relief valve (not shown) which limits the maximum pressure downstream of the nonreturn valve 33 where surges of very high pressure can occur due to the tractor bouncing over rough ground with the implement held raised.

The operation of that form of the invention shown in FIG. 1 is as follows:

Assume that a plow is connected to the three-link hitch and that the tractor commences to travel across a field with the plow in raised, inoperative position. The upper end of the hand lever 26 is in its extreme left hand position, and the valves 33, 35, 49 and 51 are closed. The device 71 is overcenter from the position shown in FIG. 1, so that arm 65 contacts the stop 76 and the plate 36 holds open the valve member 34 to return the oil delivered by the pump 28 direct to the sump 29. As soon as practicable the hand lever 26 is moved in a clockwise direction. This causes the balance lever 25 to move in an anticlockwise direction about its point of connection to the link 24. Thus the control valve 49 is moved to the right against the action of its spring 50 by the lower end of the balance lever 25 as a result of which oil is released from the cylinder 31 and the plow descends to a working position in the soil. As the plow descends, the clockwise movement of the shaft 43 causes the peg 78 to engage the projection 74 to move the overcenter device 71, the arm 65 and thus the plate 36 into the positions shown in FIG. 1. The valves 34 and 35 are now closed and the valves 33, 49 and 51 are open. As the depth of the plow increases, additional power is required to propel the tractor and the pressure in the conduits 12 and 15 accordingly increases and urges the piston 17 and the link 19 to the left. Thus the balance lever 20 is moved in an anticlockwise direction about its point of connection to the link 21, causing the link 24 to move the balance lever 25 in a clockwise direction about its point of connection to the hand lever 26. This permits the control valve 49 to move back towards the left until it reaches an equilibrium position in which it throttles the flow of oil from the pump 28 to the valve member 51 so that there is sufficient pressure in the cylinder 31 to maintain the plow at the desired working depth. The working depth of the plow is thus determined jointly by the position of the hand lever 26 and the draft force exerted by the tractor on the plow to overcome the resistance of the soil.

If the resistance of the soil increases but the slope of the ground, if any, remains the same, the pump outlet pressure in the conduits 12 and 15 increases and urges the piston 17 and the link 19 to the left. The link 21 remains stationary. Thus the link 19 acts through the balance lever 20, link 24 and balance lever 25 to permit the control valve 49 to move to the left into a new equilibrium position in which its throttling effect is increased so that the pressure in the cylinder 31 is increased and the working depth of the plow is decreased.

If the draft force subsequently decreases without any change in the slope of the ground, the control valve 49 is moved automatically to the right to reduce the pressure in the cylinder 31 and thus increase the working depth of the plow. The pressure in the cylinder 31 can not, however, fall automatically below the minimum value determined by the setting of the screwed adjusting member 54. Thus there is always a certain amount of weight being transferred from the implement to the tractor to reduce any tendency for the driving wheels of the tractor to spin.

If the gradient changes, say from level ground to an upward slope, without any change in soil resistance, the pressure in the conduits 12 and 15 increases to provide the additional power to climb the slope, and the weight 22 swings about its pivot 23 in an anticlockwise direction. Thus the link 19 is moved to the left and the link 21 is simultaneously moved to the right. The arrangement is such that for any particular gradient the movements of the links 19 and 21 cancel each other out in the sense that the balance lever 20 rocks about its point of connection to the link 24 but there is no resultant movement of the last mentioned link. Thus there is no movement of the balance lever 25 and the control valve 49 so that the working depth of the plow is unchanged.

If the gradient levels out, or changes to a downward slope, without any change in soil resistance, the link 19 is moved to the right and the link 21 is moved to the left, again without any change in the working depth of the plow.

If, however, there is a change in gradient accompanied by a change in the resistance of the soil, the resulting movements of the links 19 and 21 will not cancel each other out and thus the control valve 49 will be moved axially to cause an appropriate variation in the working depth of the plow. For example, assume that a stretch of level ground is followed by an upward slope and that the soil resistance increases at the commencement of the slope. The pressure in the conduits 12 and 15 increases appreciably both as a result of the gradient to be negotiated and as a result of the increased soil resistance. Thus the link 19 moves to the left through a distance larger than would be dictated by the gradient alone. The weight 22 pivots in an anticlockwise direction and moves the link 21 to the right through a distance proportional to the gradient. The movements of the links 19 and 21 do not cancel each other out, but result in a movement of the link 24 towards the left. This permits the control valve 49 to be moved to the left to increase the pressure in the cylinder 31 whereby the working depth of the plow is reduced in proportion to the increase in soil resistance. In another example, a change to a downward slope accompanied by an increase in soil resistance could exceptionally result in no variation in the pressure in the conduits 12 and 15, so that the link 19 would not move. The weight 22 would, however, move in a clockwise direction and act through the link 21, balance lever 20 and link 24 to move the balance lever 25 in a clockwise direction about its point of connection to the hand lever 26 thus permitting the control valve 49 to be moved to the left to increase the pressure in the cylinder 31 and reduce the working depth of the plow by an amount proportional to the increase in soil resistance.

The working depth of the plow can be varied at any time by movement of the hand lever 26.

When it is desired to raise the plow clear of the ground, the upper end of the hand lever 26 is moved to its extreme left-hand position in which the lower end of the balance lever 25 is clear of the control valve 49. Said valve is, therefore, closed by its spring 50 and, since the valve members 34 and 35 are both closed, the pressure in the conduit 30 and thus in the cylinder 31 increases to a value sufficient to lift the plow During the last few degrees of rocking movement of the shaft 43, the peg 78 engages the projection 73 and moves the device 71 overcenter. The spring 72 then acts through the arm 65, rod 64, arm 60, shaft 41, arm 40, rod 39, bellcrank lever 38, rod 37 and plate 36 to open the valve member 34 and permit the oil delivered by the pump 28 to be discharged back into the sump 29. The oil contained in the cylinder 31 is locked there by the nonreturn valve 33 and the valve member 35 to hold the plow in its raised position. If any leakage of oil should occur to cause the plow to descend below a certain height, however, the overcenter device 71 will be operated by engagement of the peg 78 with the projection 74 to effect the closure of the valve member 34, whereupon the oil delivered by the pump 28 will be forced past the nonreturn valve 33 to the cylinder 31. When sufficient oil has been admitted to said cylinder to cause the plow to be returned to its fully raised position, the device 71 will again be operated to open the valve member 34 and permit the oil delivered by the pump 28 to be discharged to the sump 29, as previously described.

If, when the plow is again lowered into work, it is found that due to the hardness of the soil it does not reach the required working depth sufficiently quickly, the upper end of the hand lever 26 is moved to its extreme right hand position. This causes the projection 59 on the balance lever 25 to contact the adjacent end of the rod 62 and move said rod axially against the action of its spring 63. The other end of the rod 62 moves the arm 60, and with it the shaft 41 and arm 40, in a clockwise direction against the action of the spring 68. The rod 39 is thus moved to the left and acts through the bellcrank lever 38, the rod 37 and the plate 36 to open both of the valve members 34 and 35 so as to connect both the pump 28 and the cylinder 31 directly to the sump 29. The pressure in said cylinder is thus reduced substantially to zero. When the plow has reached the required depth, the hand lever 26 is moved into an intermediate position at which said depth will be maintained, as a result of which the projection 59 is moved clear of the rod 62. The valve members 34 and 35 are thus permitted to be closed and the plow is again brought under the control of the valves 49 and 51.

It is an important feature of the form of the invention shown in FIG. 1 that the sensitivity of the hydraulic power lift mechanism to the draft force exerted on the implement can be varied by appropriate adjustment of the member 54 which controls the pressure at which the valve member 51 opens. For example, said mechanism may be caused to operate with a pressure drop of 350 pounds per square inch across the control valve 49 and a pressure drop of 50 pounds per square inch across the valve member 51, so that the pressure in the hydraulic cylinder 31 is 400 pounds per square inch. To achieve the first mentioned pressure drop the control valve 49 is nearly closed and even a small movement of the balance lever 25 due to a small variation in draft force will have a marked effect upon the pressure in the cylinder 31. This enables the hydraulic power lift mechanism to operate with a very high degree of effectiveness when a light-draft implement such as a cultivator is connected to the three-link hitch. Alternatively, a pressure of 400 pounds per square inch in the cylinder 31 can be achieved by adjusting the pressure drop across the control valve 49 to, say, 50 pounds per square inch and that across the valve member 51 to 350 pounds per square inch. Thus the control valve 49 is open to a much greater extent than in the previous example, and accordingly the hydraulic power lift mechanism is far less sensitive to variations in the draft force exerted on the implement. This enables said mechanism to operate with an equally high degree of effectiveness when a heavy-draft implement such as a plow is connected to the three-link hitch.

In the form of the invention shown in FIG. 1, the adjustable pressure relief valve assembly must be connected hydraulically in series with the control valve 49, but said assembly can be located upstream of the control valve provided that provision is made to hold the ball 53 on its seat when a high pressure is required in the cylinder 31 to raise an implement into inoperative position. When so located, said assembly controls the sensitivity of the hydraulic power lift mechanism and the minimum weight transference from the implement to the tractor in exactly the same manner as when it is located downstream of the control valve 49 as illustrated.

Figure 2:
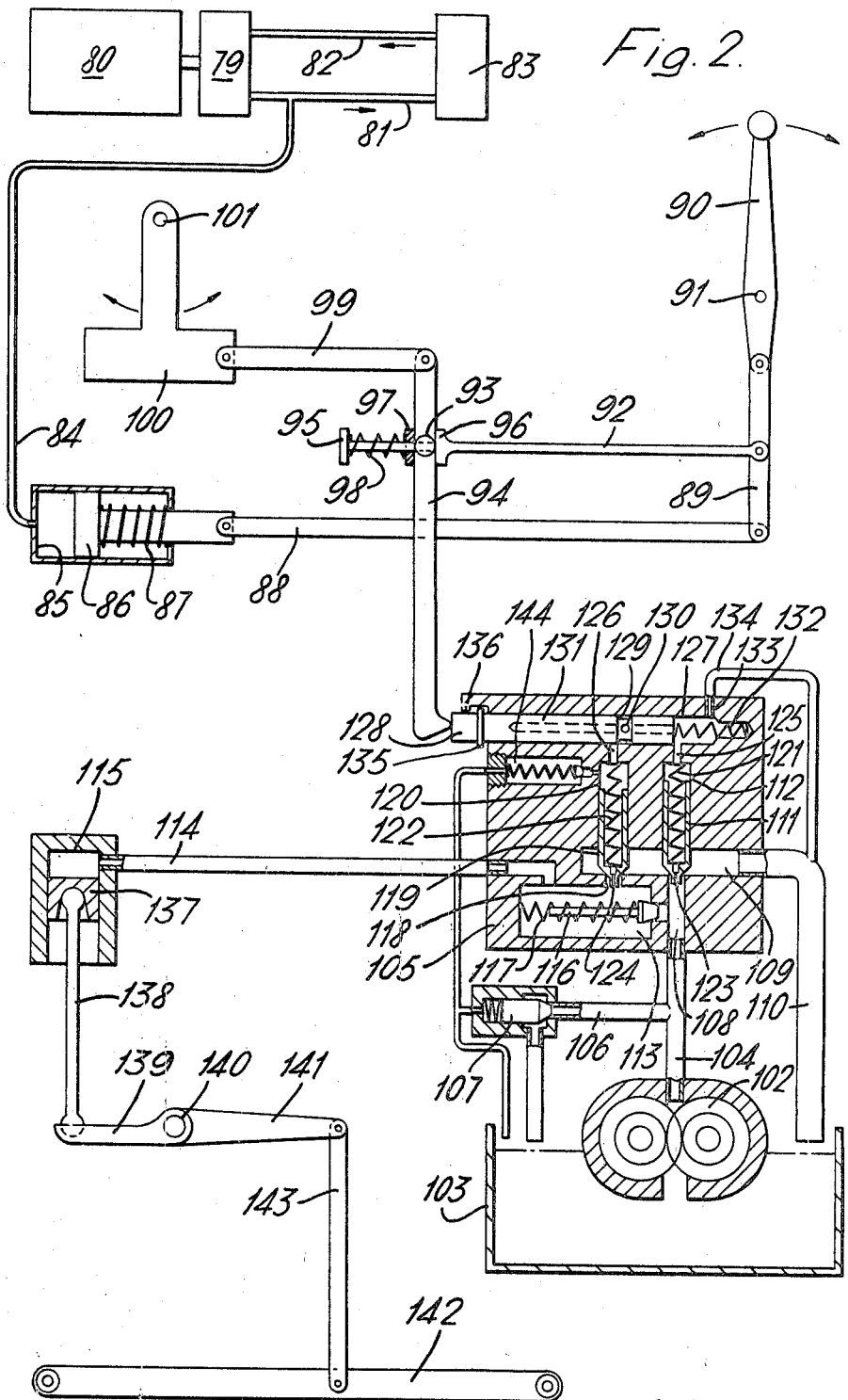
FIG. 2 is a diagrammatic representation of an alternative form thereof.

Referring now to FIG. 2, a hydrostatic power transmission mechanism comprises a pump 79 driven by an engine 80 and connected by a supply conduit 81 and a return conduit 82 to a hydraulic motor 83 which is drivably connected to the rear wheels (not shown) of a tractor. The supply conduit 81 is connected by a conduit 84 to a cylinder 85 containing a piston 86 acted upon by a helical compression spring 87. The piston 86 is pivotally connected to one end of a link 88 the other end of which is pivotally connected to the lower end of a subsidiary balance lever 89. The upper end of said lever is pivotally connected to the lower end of a hand control lever 90 which is movable about a fixed pivot 91. A rod 92 is pivotally connected at one of its ends to a point on the lever 89 between the ends thereof. Said rod is slidable through a diametrical hole in a stud 93 rotatably mounted between the ends of a main balance 94. The rod 92 carries fixed flanges 95 and 96 and a slidable collar 97. A helical compression spring 98 is confined between the flange 95 and the collar 97, and the stud 93 is located between the collar 97 and the flange 96. The upper end of the lever 94 is pivotally connected to one end of a link 99 the other end of which is pivotally connected to a weight 100 which can swing about a fixed pivot 101 the axis of which is transverse to the direction of travel of the tractor. Friction means (not shown) are provided to hold the hand lever 90 in any required position against the action of the various forces transmitted to the balance lever 89.

A pump 102 draws oil from a sump 103 and delivers it through a conduit 104 to a valve block 105. The conduit 104 can communicate with the sump 103 by way of a branch conduit 106 containing a high-pressure relief valve 107 which limits the maximum pressure delivered by the pump 102. The valve block 105 contains a passage 108 communicating with the conduit 104, a passage 109 intersected by the passage 108 and communicating with a conduit 110 leading to the sump 103, a poppet valve 111 slidable in a bore 112 and adapted when closed to prevent oil flowing from the passage 108 into the passage 109, a passage 113 intersecting the passage 108 and communicating with a conduit 114 leading to a single-acting hydraulic cylinder 115, a nonreturn valve 116 adapted to prevent oil flowing from the passage 113 into the passage 108 and provided with a spring 117 so as to allow oil to flow from the passsge 108 into the passage 113 only when the pressure of said oil exceeds a predetermined value, a port 118 connecting the passages 109 and 113, and a poppet valve 119 slidable in a port 120 and adapted when closed to prevent oil flowing from the passage 113 into the passage 109 through the port 118. The poppet valves 111 and 119 are urged towards their seats by respective helical compression springs 121 and 122, and are provided with respective axial bleed holes 123 and 124 to enable oil to flow at a restricted rate from the passages 108 and 113 into the respective bores 112 and 120. Said bores communicate by way of respective ports 125 and 126 with a bore 127 containing an axially movable control valve 128 comprising a slide valve one end of which projects from the valve block 105. Said control valve is provided with a portion 129 of reduced diameter which communicates by way of a radial hole 130 with an axial hole 131 which opens into the bore 127 at the inner end of the control valve. A helical compression spring 132 is located between the inner end of the bore 127 and the inner end of the control valve 128, and a hole 133 connects the inner end of the bore 127 with a branch conduit 134 communicating with the conduit 110. The outer end of the control valve 128 is provided with a collar 135 which limits the inward movement of the control valve by abutting against the face of the valve block 105 and limits outward movement of said valve by abutting against a stop 136 carried by the valve block 105. The lower end of the main balance lever 94 bears against the outer end of the control valve 128.

The hydraulic cylinder 115 contains a ram 137 which acts through a spherically ended connecting rod 138 on an arm 139 fixed to a shaft 140 extending laterally across the rear of the tractor, and said shaft can thus be rocked by movement of the ram 137 in the cylinder 115 to cause two laterally spaced lift arms 141 rigidly secured on said shaft to move a pair of laterally spaced lower hitch links 142 about their points of pivotal connection to the tractor by means of respective lift rods 143. For clarity, only one lift arm and its associated hitch link and lift rod are illustrated. A conventional, central, upper hitch link (not shown) is pivotally connected at its front end to the rear of the tractor. Thus an implement connected to the rear ends of the two links 142 and of the upper hitch link can be raised to, and allowed to descend from, an inoperative position.

The bore 120 communicates with the sump 103 by way of a high-pressure relief valve 144 which limits the maximum pressure downstream. of the nonreturn valve 116 where surges of very high pressure can occur due to the tractor bouncing over very rough ground with the implement held raised.

The operation of that form of the invention shown in FIG. 2 is as follows:

Assume that a plow is connected to the three-link hitch and that the tractor commences to travel across a field with the plow in raised, inoperative position. The upper end of the hand lever 26 is in its extreme left hand position, and the control valve 128 occupies the position illustrated in which the port 125 is open and the port 126 is closed. Thus oil which has entered the bore 112 from the passage 108 via the bleed hole 123 can escape to the sump 103 by way of the port 125, the bore 127, the hole 133, the branch conduit 134 and the conduit 110, as a result of which the poppet valve 111 is hydraulically unbalanced. Said valve is therefore held open by the pressure of oil in the passage 108 and said oil returns to the sump 103 via the passage 109 and the conduit 110. Oil which has entered the bore 120 from the passage 113 via the bleed hole 124 can not, however, escape to the sump 103 by way of the port 126 as said port is closed, and the poppet valve 119 is therefore hydraulically balanced and is caused by its spring 122 to close the port 118. Due to the poppet valve 111 being unbalanced and thus open, the pressure of oil in the passage 108 is not sufficient to open the nonreturn valve 116. As soon as practicable the hand lever 90 is moved in a clockwise direction. This causes the balance lever 89 to move in an anticlockwise direction about its point of connection to the link 88 whereupon the rod 92 causes the balance lever 94 to move in a clockwise direction about its point of connection to the link 99. Thus the control valve 128 follows the receding lower end of the lever 94 under the action of its spring 132, that is to say said valve is moved towards the left as a result of which it opens the port 126 whilst the port 125 remains open. Oil can therefore escape to the sump 103 from the bore 112 by way of the port 125, the bore 127, the hole 133, the branch conduit 134 and the conduit 110, and from the bore 120 by way of the port 126, the space surrounding the portion 129 of the control valve 128, the radial hole 130 and the axial hole 131 in said valve, the bore 127, the hold 133, the branch conduit 134 and the conduit 110. As a result, both of the poppet valves 111 and 119 are hydraulically unbalanced and the valve 111 is held open by the pressure of oil in the passage 108 whilst the valve 119 is opened by the pressure of oil in the passage 113. Oil in the passage 108 therefore returns to the sump 103 via the passage 109 and the conduit 110, the pressure of oil in the passage 108 being insufficient to open the nonreturn valve 116. Oil can also escape to the sump 103 via the passage 109 and the conduit 110 from the passage 113, the conduit 114 and the cylinder 115. The plow therefore descends to a working position in the soil. As the depth of the plow increases, additional power is required to propel the tractor and the pressure in the conduits 81 and 84 accordingly increases and urges the piston 86 and the link 88 to the right. Thus the balance lever 89 is moved in an anticlockwise direction about its point of connection to the hand lever 90, causing the rod 92 to move the balance lever 94 in an anticlockwise direction about its point of connection to the stationary link 99. This causes the control valve 128 to be moved back towards the right until it reaches the position illustrated in which some oil is locked in the cylinder 115 to maintain the plow at the desired working depth whilst the oil delivered by the pump 102 is discharged back into the sump 103. The working depth of the plow is thus determined jointly by the position of the hand lever 90 and the draft force exerted by the tractor on the plow to overcome the resistance of the soil.

If the resistance of the soil increases but the slope of the ground, if any, remains the same, the pump outlet pressure in the conduits 81 and 84 increases and urges the piston 86 and the link 88 to the right. The link 99 remains stationary. Thus the link 88 acts through the balance lever 89, rod 92 and balance lever 94 to move the control valve 128 to the right of the position illustrated so that it closes the port 125 whilst the port 126 remains closed. Oil is therefore prevented from escaping from both of the bores 112 and 120 as a result of which both of the poppet valves 111 and 119 are hydraulically balanced and the valve 111 closes to prevent oil flowing from the passage 108 into the passage 109 whilst the valve 119 continues to close the port 118. Oil under pressure in the passage 108 therefore opens the nonreturn valve 116 against the action of its spring 117 and said oil flows through the passage 113 and the conduit 114 to the cylinder 115. The resultant movement of the ram 132 acts through the rod 138 to move the shaft 140 angularly about its axis in an anticlockwise direction so as to reduce the working depth of the plow As said depth decreases the draft force and thus the pressure in the conduits 81 and 84 also decreases and the link 88 accordingly moves to the left resulting in the control valve 128 returning to the position illustrated. Thus oil is locked in the cylinder 115 so as to support the plow at a decreased working depth.

If the draft force subsequently decreases without any change in the slope of the ground, the control valve 128 is allowed to move to the left in order to release oil from the cylinder 115 and thus increase the working depth of the plow the consequent increase in draft force then returning said valve to the position illustrated. This oil is again locked in the cylinder 115 to support the plow at its increased working depth.

If the gradient changes, say from level ground to an upward slope, without any change in soil resistance, the pressure in the conduits 81 and 84 increases to provide the additional power to climb the slope and the weight 100 swings about its pivot 101 in an anticlockwise direction. Thus the link 88 is moved to the right and acts through the balance lever 89 to move the rod 92 to the right, whilst the link 99 also moves to the right. The arrangement is such that for any particular gradient the movements of the rod 92 and the link 99 cancel each other out in the sense that there is no resultant movement of the lower end of the balance lever 94. Thus there is no movement of the control valve 128 so that the working depth of the plow is unchanged.

If the gradient levels out, or changes to a downward slope, without any change in soil resistance, the links 88 and 99 are both moved to the left, again without any change in the working depth of the plow If, however, there is a change in gradient accompanied by a change in the resistance of the soil, the resulting movements of the rod 92 and link 99 will not cancel each other out and thus the control valve 128 will be actuated to cause an appropriate variation in the working depth of the plow For example, assume that a stretch of level ground is followed by an upward slope and that the soil resistance increases at the commencement of the slope. The pressure in the conduits 81 and 94 increases appreciably both as a result of the gradient to be negotiated and as a result of the increased soil resistance. Thus the link 88, and the rod 92, move to the right through a distance larger than would be dictated by the gradient alone. The weight 100 pivots in an anticlockwise direction and moves the link 99 to the right through a distance proportional to the gradient. The movements of the rod 92 and the link 99 do not cancel each other out, but result in a movement of the lower end of the balance lever 94 towards the right. This causes the control valve 128 to move to the right of the position illustrated and admit oil under pressure to the cylinder 115 whereby the working depth of the plow is reduced in proportion to the increase in soil resistance. As the working depth decreases the load on the tractor engine 80 decreases and the pressure in the conduits 81 and 84 falls so that the link 88 moves back towards the left and acts through the balance lever 89, rod 92 and balance 94 to allow the control valve 128 to return to the position illustrated. In another example, a change to a downward slope accompanied by an increase in soil resistance could exceptionally result in no variation in the pressure in the conduits 81 and 84, so that the rod 92 would not move. The weight 100 would, however, move in a clockwise direction and act through the link 99 to move the balance lever 94 in an anticlockwise direction about the stud 93 thus causing the control valve 128 to move to the right of the position illustrated to admit oil under pressure to the cylinder 115 so as to reduce the working depth of the plow by an amount proportional to the increase in soil resistance. As the working depth decreased the pressure in the conduits 81 and 84 would decrease and allow the link 88 to move to the left, thus moving the rod 92 to the left and causing the balance lever 94 to allow the control valve 128 to return to the position illustrated.

The working depth of the plow can be varied at any time by movement of the hand lever 90.

When it is desired to raise the plow clear of the ground, the upper end of the hand lever 90 is moved to its extreme left hand position as a result of w which the control valve 128 is moved to the right hand end of its range of movement and any excess of movement of the rod 92 is accommodated, without risk of damage, by the flange 96 moving out of contact with the stud 93 against the action of the spring 98. The control valve blanks off both of the ports 125 and 126 as a result of which both of the poppet valves 111 and 119 are closed and oil delivered by the pump 102 can flow only to the cylinder 115 to raise the plow out of work. As the plow is being raised, the reduction in draft force permits the link 88 to move to the left whereupon the rod 92 also moves to the left until the flange 96 once again contacts the stud 93. When the plow reaches its fully raised position, the hand lever 90 can be moved in a clockwise direction into a predetermined position adjacent its extreme left-hand position so as to move the balance lever 94 in a clockwise direction about its point of connection to the link 99 whereby the control valve 128 is permitted to move through a sufficient distance to the left to open the port 125 but not the port 126, so that the oil delivered by the pump 102 is discharged back into the sump 103 but oil under pressure is locked in the cylinder 115. Alternatively, the poppet valve 111 can be connected to the shaft 140 by a linkage (not shown) similar to that illustrated in FIG. 1, so that said valve is lifted mechanically from its seat during the last few degrees of anticlockwise rocking movement of said shaft without the need for any movement of the upper end of the hand lever 90 out of its extreme left-hand position.

The pitch responsive means employed in any form of the invention is not necessarily a pivoted weight but might for example be a gyroscopic device, or a system of electrical switches operated by mercury in a bank of U-tubes. Similarly, the pressure responsive means employed in any form of the invention is not necessarily a spring-loaded piston in a cylinder but might for example be a diaphragm device. The axially movable control valve employed need not be located on the delivery side of the pump of the hydraulic power lift mechanism but can equally well be located in known manner on the suction side thereof. The control valve need not be axially movable but might for example be a rotary valve.

I claim:
1. In a tractor having a hydrostatic power transmission assembly including at least one pump and having hydraulic power lift means for operating hitch means for mounting an implement on the tractor, said power lift means comprising an actuating circuit including a movable control valve, a hand lever, mechanism connecting the hand lever to said valve, pressure responsive means actuated by changes in the transmission pump outlet pressure and connected to said mechanism for automatically tending to move said valve in the implement lowering direction on any decrease in said pressure, and means automatically responsive to the fore-and-aft pitch of the tractor for canceling out the effect on said power lift circuit of variations in the transmission pump outlet pressure due to changes in said pitch comprising pitch responsive means actuated by changes in the fore-and-aft pitch of the tractor and connected to said mechanism for automatically tending to move said valve in the implement raising direction when the front of the tractor falls and in the implement lowering direction when the front of the tractor rises.

2. In the tractor defined in claim 1, said pitch responsive means comprising a pivoted weight operably connected to said mechanism.

3. In the tractor defined in claim 2, said mechanism comprising balance lever means operably connected to said control valve and pivotally connected to said weight.

4. In the tractor defined in claim 3, said pressure responsive means comprising a cylinder connected to receive said transmission outlet pressure and a resiliently biased piston in said cylinder pivotally connected to said balance lever means.

5. In the tractor defined in claim 1, said control valve being a slide valve in said power lift circuit and said mechanism comprises a pivoted lever operably connected to said slide valve.

6. In the tractor defined in claim 1, said control valve being a throttling valve in said power lift circuit.

7. In the tractor defined in claim 6, an adjustable pressure relief valve in said circuit connected hydraulically in series with said throttling valve.

8. In the tractor defined in claim 7, said relief valve being located on the downstream side of said throttling valve.

9. In a tractor having a hydrostatic power transmission assembly including at least one pump and having hydraulic power lift means for operating hitch means for mounting an implement on the tractor, said power lift means comprising means defining a hydraulic circuit operably connected to said hitch means and having an axially movable spring-biased control valve, a hand lever, motion transmitting mechanism including a pivoted balance lever operable connected to said control valve and said hand lever whereby said control valve may be set to condition said circuit to dispose said implement in a predetermined operative position, pressure responsive means comprising a piston movable in a cylinder by changes in the transmission pump outlet pressure and connected to said mechanism to shift said balance lever for automatically moving said control valve to condition said circuit for actuating said hitch means in the implement raising direction on any increase in said pressure and in the implement lowering direction on any decrease in said pressure, and means automatically responsive to fore-and-aft pitch of the tractor for canceling out the effect on said power lift circuit of variations in the transmission pump outlet pressure due to changes in said pitch comprising gravity responsive means including a weight pivoted about an axis extending transversely of the tractor and operably connected to said balance lever for automatically moving said control valve to condition said circuit for actuating said hitch means in the implement raising direction when the front of the tractor falls and in the implement lowering direction when the front of the tractor rises.